(12) United States Patent
Enjoji et al.

(10) Patent No.: US 7,595,125 B2
(45) Date of Patent: Sep. 29, 2009

(54) FUEL CELL STACK FOR VEHICLE

(75) Inventors: Naoyuki Enjoji, Utsunomiya (JP); Masaharu Suzuki, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 274 days.

(21) Appl. No.: 10/626,225

(22) Filed: Jul. 24, 2003

(65) Prior Publication Data

US 2004/0101739 A1    May 27, 2004

(30) Foreign Application Priority Data

Jul. 24, 2002    (JP) ............... 2002-215710

(51) Int. Cl.
H01M 4/86    (2006.01)
(52) U.S. Cl. ............... 429/32; 429/40; 429/38
(58) Field of Classification Search ............ 429/40, 429/38, 32
See application file for complete search history.

(56) References Cited

U.S. PATENT DOCUMENTS

| | | | |
|---|---|---|---|
| 4,431,714 A | 2/1984 | Myerhoff | |
| 5,193,635 A | 3/1993 | Mizuno et al. | 180/65.3 |
| 5,641,031 A | 6/1997 | Riemer et al. | 180/65.1 |
| 5,662,184 A | 9/1997 | Riemer et al. | 180/65.1 |
| 6,223,843 B1 | 5/2001 | O'Connell et al. | |
| 6,348,280 B1 | 2/2002 | Maeda et al. | |
| 6,368,739 B1 | 4/2002 | Frost et al. | |
| 6,420,061 B1 | 7/2002 | Fujii et al. | |
| 6,492,055 B1 * | 12/2002 | Shimotori et al. | 429/34 |
| 6,548,199 B1 | 4/2003 | Tanaka et al. | |
| 6,613,470 B1 | 9/2003 | Sugita et al. | |
| 2001/0030069 A1 | 10/2001 | Misu et al. | |

FOREIGN PATENT DOCUMENTS

| | | |
|---|---|---|
| CA | 2318993 A1 | 6/2000 |
| CA | 2351871 | 12/2001 |
| DE | 10008022 A1 | 8/2000 |
| DE | 10041532 A1 | 3/2001 |
| DE | 10041532 A2 | 3/2001 |
| DE | 10047145 A1 | 3/2001 |
| DE | 10047145 A3 | 3/2001 |
| EP | 0929112 A2 | 7/1999 |
| EP | 1246281 A1 | 10/2002 |

(Continued)

OTHER PUBLICATIONS

Canadian Office Action for Application No. 2,435,899, dated Oct. 5, 2007.

(Continued)

*Primary Examiner*—Jane Rhee
(74) *Attorney, Agent, or Firm*—Lahive & Cockfield, LLP; Anthony A. Laurentano, Esq.

(57) ABSTRACT

A unit cell includes a membrane electrode assembly, and first and second separators for sandwiching the membrane electrode assembly. The membrane electrode assembly includes an anode and a cathode having a substantially square shape having a side length L1 in a range of 140 mm to 200 mm. The first and second separators have a substantially square shape having a side length L2 in a range of 200 mm to 300 mm.

5 Claims, 18 Drawing Sheets

FOREIGN PATENT DOCUMENTS

| | | |
|---|---|---|
| EP | 1246281 B8 | 10/2002 |
| JP | 60-93764 | 5/1985 |
| JP | 08-171926 | 2/1996 |
| JP | 9-63622 | 3/1997 |
| JP | 9-134732 | 5/1997 |
| JP | 10-106610 | 4/1998 |
| JP | 11-067259 | 3/1999 |
| JP | 2000-21422 | 1/2000 |
| JP | 2000-100456 | 4/2000 |
| JP | 2000-149974 | 5/2000 |
| JP | 2000-195529 A1 | 7/2000 |
| JP | 2001-85041 A2 | 3/2001 |
| JP | 2001-118592 B11 | 4/2001 |
| JP | 2002-25570 | 1/2002 |
| JP | 2002-50391 | 2/2002 |
| WO | WO-01/13441 A2 | 2/2001 |

OTHER PUBLICATIONS

Japanese Office Action for Application No. 2002-215710, dated Feb. 19, 2008.
Canadian Office Action for Application No. 2,435,899, dated Aug. 15, 2008.
Canadian Office Action for Application No. 2,435,899, dated Jun. 22, 2009.
Canadian Office Action for Application No. 2,435,899, dated Dec. 13, 2006.
European Search Report for Application No. 03254609.5-1227, dated Nov. 16, 2006.

\* cited by examiner

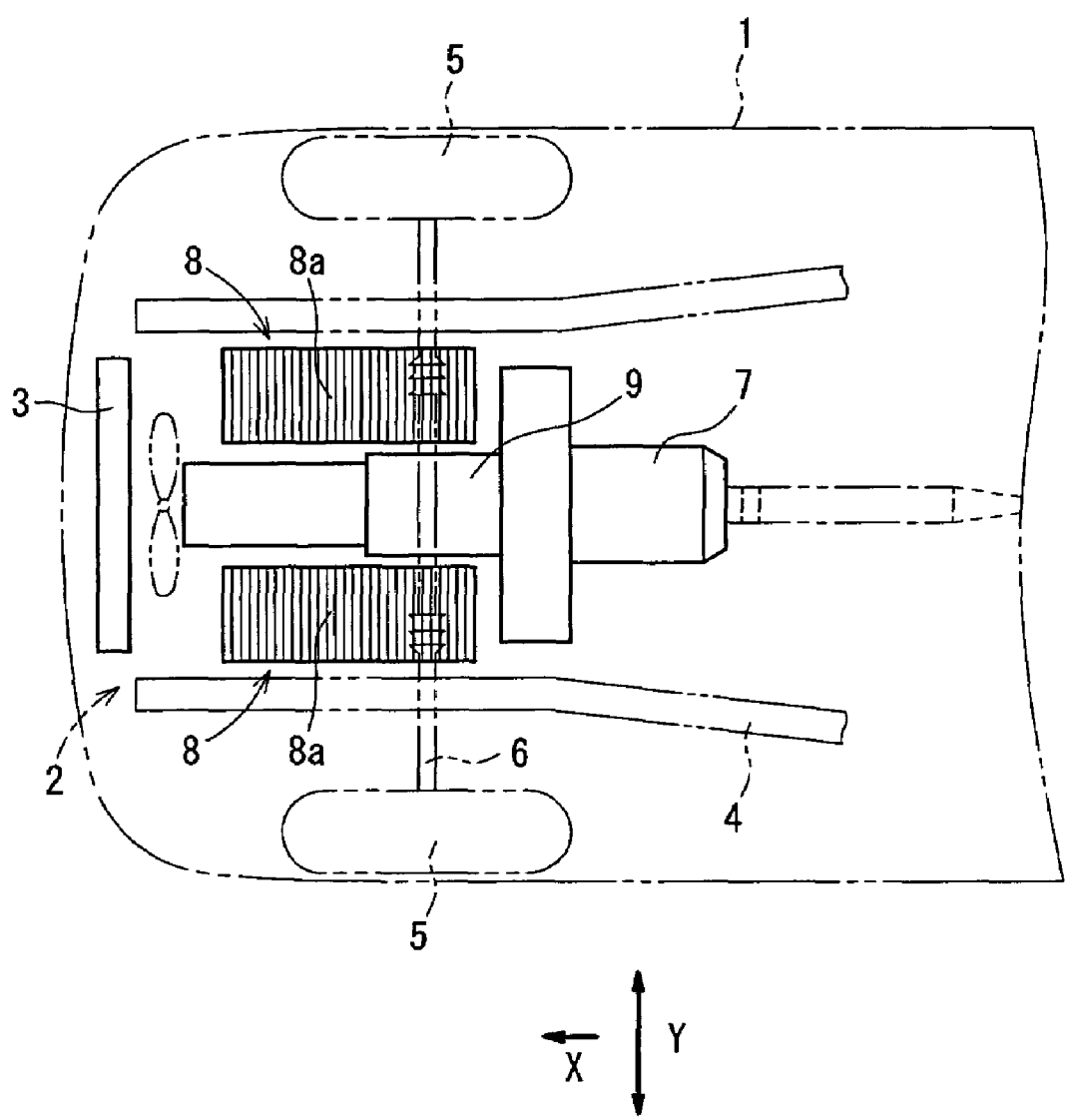

FUEL CELL STACK FOR VEHICLE

BACKGROUND OF THE INVENTION

1. Field of the Invention

The present invention relates to a fuel cell stack formed by stacking electrolyte electrode assemblies and separators alternately. Each of the electrolyte electrode assemblies includes a pair of electrodes and an electrolyte interposed between the electrodes. The fuel cell stack is installed in a vehicle.

2. Description of the Related Art

For example, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). The membrane electrode assembly is interposed between separators.

The membrane electrode assembly and the separators make up a unit of a fuel cell (unit cell) for generating electricity. Typically, a predetermined number of membrane electrode assemblies and separators are connected together to form a fuel cell stack. In the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte membrane which is appropriately humidified, and the electrons flow through an external circuit to the cathode, creating a DC electric current. An oxygen-containing gas or air is supplied to the cathode. At the cathode, the hydrogen ions from the anode combine with the electrons and oxygen to produce water.

U.S. Pat. No. 5,662,184 (prior art 1) discloses a type of the fuel cell stack for use in a vehicle. As shown in FIG. 18, in the prior art 1, a fuel cell system is installed in a front box 2 of the vehicle 1. A radiator 3 is provided at a front region in the front box 2 of the vehicle 1. Outside a vehicle frame 4, front wheels 5 are rotatably attached to opposite ends of a front axle 6. A motor 7 is driven to rotate the front axle 6. A pair of fuel cell stacks 8 are provided inside the vehicle frame 4 for supplying electricity to the motor 7. A compressor 9 for supplying an oxygen-containing gas is interposed between the fuel cell stacks 8. Though not illustrated, components such as fuel tanks, a reformer, and a compressor for supplying a fuel gas are provided in a rear region (on the side of a trunk) of the vehicle 1. Each of the fuel cell stacks 8 includes a plurality of unit cells 8a stacked in a horizontal direction indicated by an arrow X.

If the fuel cell stacks 8 are attempted to be installed in a vehicle of a different type, the space for installation may be different. Therefore, the arrangement of the unit cells 8a such as the shape of the electrodes of the unit cells 8a, and the dimensions of reactant gas passages need to be designed again. Further, the position for installing the fuel cell stack 8 often changes depending on the type of the vehicle. For example, the fuel cell stack 8 may be installed under the vehicle floor, in the front box, in the trunk box, or in the ceiling region of the vehicle. When the installation position changes, installation conditions such as the shape and dimensions of the space for installing the fuel cell stack 8 may be different.

Therefore, various designs of dedicated fuel cell stacks 8 are needed for the different installation positions, i.e., to meet the different installation conditions in the various types of vehicles. The expense for the different designs, and the factory equipment cost for producing the different fuel cell stacks 8 are high.

In an attempt to address the problem, for example, Japanese Laid-Open patent publication 11-67259 (prior art 2) discloses a stack structure for a fuel cell having an inner manifold type separator in which each of an electrode part and a manifold part has a square shape. With the structure, a plurality of the fuel cells are arranged easily adjacent to each other in a horizontal direction or a vertical direction.

However, the prior art 2 merely discloses the electrode part and the manifold part having a square shape, and the fuel cell stack may not be used practically in the vehicle application. When a plurality of fuel cell stacks are arranged adjacent to each other laterally, for example, the overall dimension of the fuel cell stacks in the lateral direction may be too large. The surface area of the electrodes of the unit cell may be small. In this case, a large number of unit cells need to be stacked for obtaining a high power output. Therefore, the dimension in the stacking direction of the unit cells is large, and the fuel cell stack can not be installed effectively in different positions in various types of vehicles, i.e., in spaces having different sizes and shapes.

SUMMARY OF THE INVENTION

A main object of the present invention is to provide a fuel cell stack having a cell arrangement which can be easily installed in different positions in various types of vehicles. The fuel cell stack is used in various applications, and economically used particularly in the vehicle application.

According to the present invention, electrodes have a substantially square shape having a side length in a rage of 140 mm to 200 mm, and separators have a substantially square shape having a side length in a range of 200 mm to 300 mm. Therefore, the size of the overall fuel cell stack is reduced effectively.

When the fuel cell stack is installed in a vehicle, the conditions (e.g., the shape and size of the space) for installing the fuel cell stack may change depending on the type of the vehicle. The electrodes have a substantially square shape having a side length in the range of 140 mm to 200 mm. The electrodes have a sufficiently large surface area. Thus, it is not necessary to stack a large number of unit cells for obtaining a desired power output. When the surface area is less than 200 $cm^2$, the stack volume needs to be significantly large. When the surface area is greater than 400 $cm^2$, the gas pressure loss in the electrode surface is large.

The separators have a substantially square shape having a side length in the range of 200 mm to 300 mm. Therefore, when the fuel cell stacks are juxtaposed laterally to form an assembly, the dimension of the assembly in the lateral direction is not excessively large.

Therefore, by changing the number of unit cells stacked to form the fuel cell stack, changing the stacking direction, changing the number of fuel cell stacks arranged to form the assembly, changing the orientation of the fuel cell stacks arranged to form the assembly, for example, the fuel cell stack can be installed in different positions in various types of vehicles.

A reactant gas supply passage and a reactant gas discharge passage extend through two parallel side portions of the separators in the stacking direction, and a coolant supply passage and a coolant discharge passage extend through other two parallel side portions of the separators in the stacking direction.

Therefore, the surfaces of the separators can be utilized efficiently, and the size of the overall fuel cell stack can be reduced easily. The separators have a substantially square shape having a side length in the range of 200 mm to 300 mm. Cross sectional areas of the openings of the supply passages and discharge passages are suitable for maintaining necessary flows of gases.

Further, centers of the electrodes are substantially in alignment with centers of the separators. Therefore, the supply passages and the discharge passages are formed symmetrically, and the reactions in the electrode surfaces are uniform. Thus, the power generation performance can be improved effectively.

Further, a straight reactant gas flow passage connecting the reactant gas supply passage and the reactant gas discharge passage is formed on a surface of the separator for supplying a reactant gas to the electrode. Therefore, the gas pressure loss in the gas flowing through the reactant gas flow passage is reduced effectively, and the desired power generation performance is maintained.

The fuel cell stack is used for selectively forming a first assembly, a second assembly, a third assembly, and a fourth assembly depending on conditions for installing the fuel cell stack in the vehicle. The first assembly is formed by juxtaposing two fuel cell stacks adjacent to each other such that the stacking direction is oriented substantially vertically. The second assembly is formed by arranging four fuel cell stacks in a square shape in a plan view such that the stacking direction is oriented substantially vertically. The third assembly is formed by juxtaposing two fuel cell stacks adjacent to each other such that the stacking direction is oriented substantially horizontally. The fourth assembly is formed by arranging four fuel cell stacks in a square shape in a front view such that the stacking direction is oriented substantially horizontally.

Any of the first through fourth assemblies can be selected depending on the shape and size of the space for installing the fuel cell stack in the vehicle. Therefore, the design, development, equipment for producing the dedicated fuel cell stack for each type of the vehicles are not necessary. Since the fuel cell stack having the same cell structure can be installed in various types of vehicles, the production cost for the fuel cell stack is significantly reduced. The fuel cell stack can be used in a large vehicle which requires a large output, simply by increasing the number of the fuel cell stacks, and the number of the unit cells. No changes in the design of the electrode surface are required. Therefore, the fuel cell stack can be produced easily and economically.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 18 is a view showing a conventional fuel cell stack installed in a front box of a vehicle.

DESCRIPTION OF THE PREFERRED EMBODIMENTS

Figure 1:
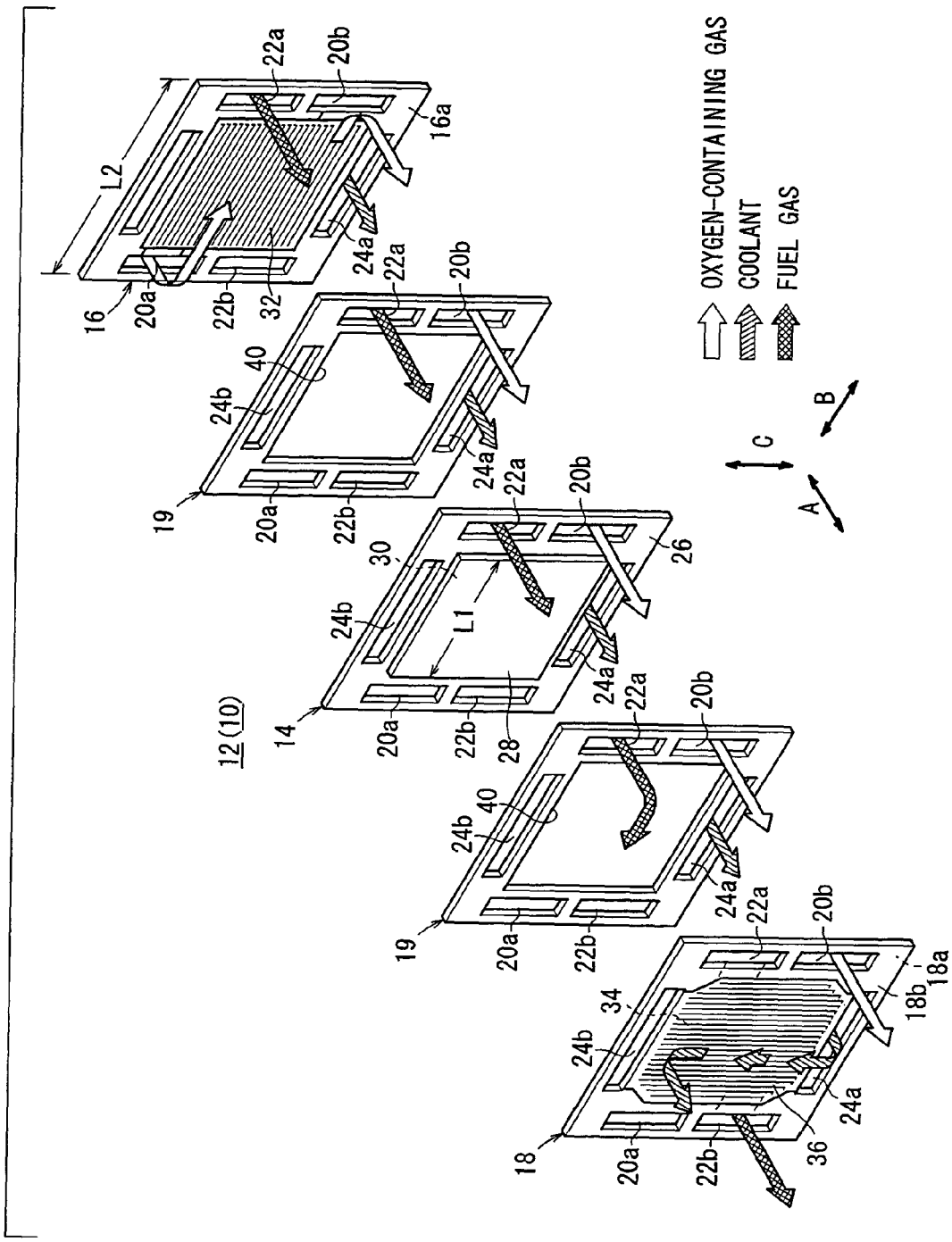
FIG. 1 is an exploded perspective view showing main components of a unit cell of a fuel cell stack according to an embodiment of the present invention.
Figure 2:
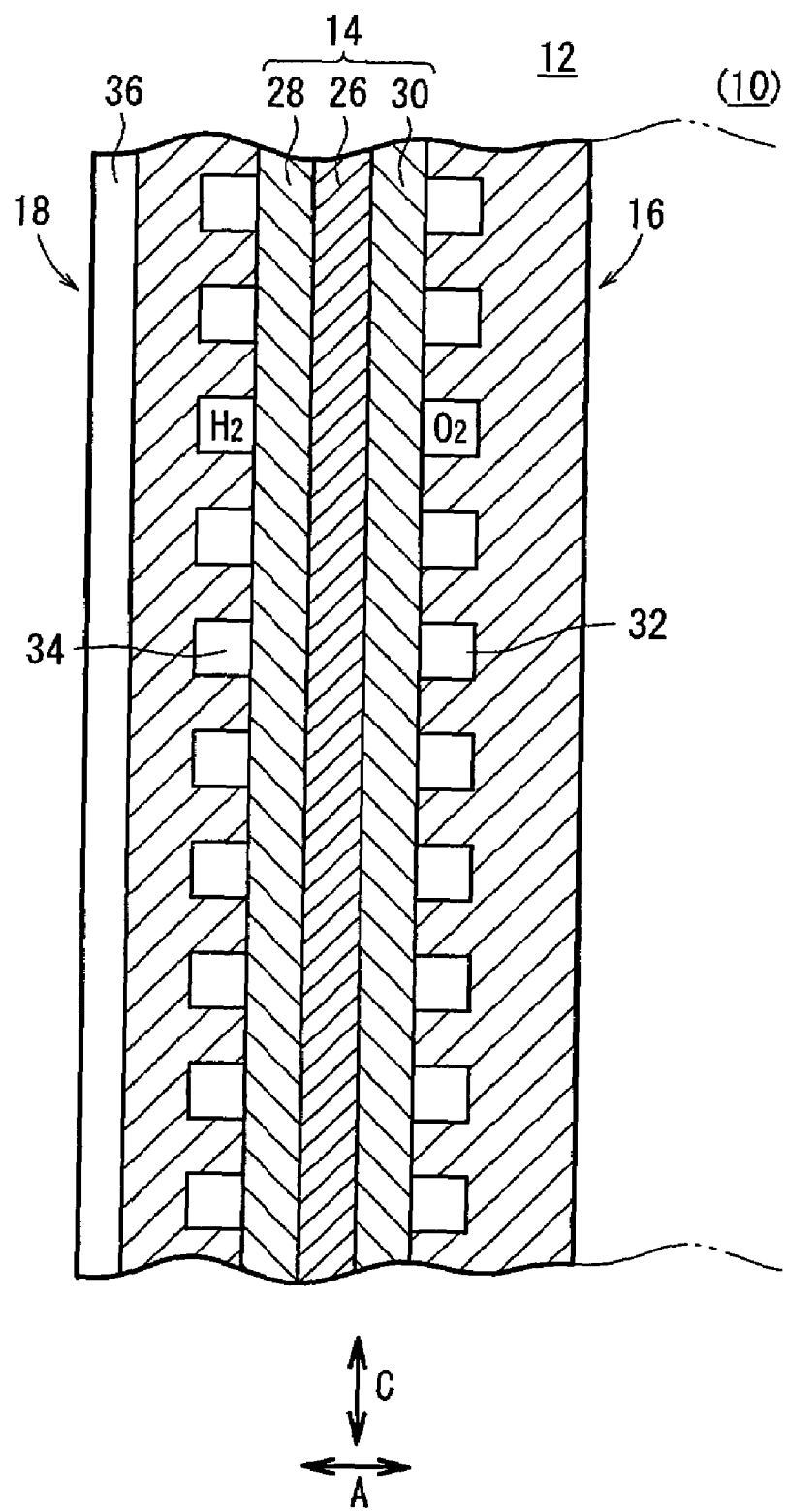
FIG. 2 is a cross sectional view showing a part of the unit cell.

FIG. 1 is an exploded perspective view showing main components of a unit cell 12 of a fuel cell stack 10 according to an embodiment of the present invention, and FIG. 2 is a cross sectional view showing a part of the unit cell 12. The unit cell 12 includes a membrane electrode assembly (electrolyte electrode assembly) 14, and a first separator 16 and a second separator 18 for sandwiching the membrane electrode assembly 14. A seal members 19 such as a gasket is interposed between the membrane electrode assembly 14 and the first separator 16, and between the membrane electrode assembly 14 and the second separator 18 for sealing passages as described later on, and sealing the outer circumference of the electrode surfaces (power generation surface). A plurality of the unit cells 12 are stacked together in a stacking direction indicated by an arrow A to form the fuel cell stack 10.

At an end of the unit cells 12 in the direction perpendicular to the stacking direction, i.e., in the horizontal direction indicated by an arrow B in FIG. 1, an oxygen-containing gas supply passage 20a for supplying an oxygen-containing gas, and a fuel gas discharge passage 22b for discharging a fuel gas such as a hydrogen-containing gas are formed. The oxygen-containing gas supply passage 20a and the fuel gas discharge passage 22b extend in the direction indicated by the arrow A.

At the other end of the unit cells 12 in the direction indicated by the arrow B, a fuel gas supply passage 22a for supplying the fuel gas, and an oxygen-containing gas discharge passage 20b for discharging the oxygen-containing gas are formed. The fuel gas supply passage 22a and the oxygen-containing gas discharge passage 20b extend in the direction indicated by the arrow A.

At a lower end of the unit cells 12, a coolant supply passage 24a for supplying a coolant such as pure water, an ethylene glycol or an oil is formed, and at an upper end of the unit cells 12, a coolant discharge passage 24b for discharging the coolant is formed.

The membrane electrode assembly 14 includes an anode 28, a cathode 30, and an ion exchange membrane 26 of a solid electrolyte interposed between the anode 28 and the cathode 30. The ion exchange membrane 26 is formed by impregnating a thin membrane of perfluorosulfonic acid with water, for example. Each of the anode 28 and cathode 20 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 28 and the electrode catalyst layer of the cathode 30 are fixed to both surfaces of the ion exchange membrane 26, respectively.

Figure 3:
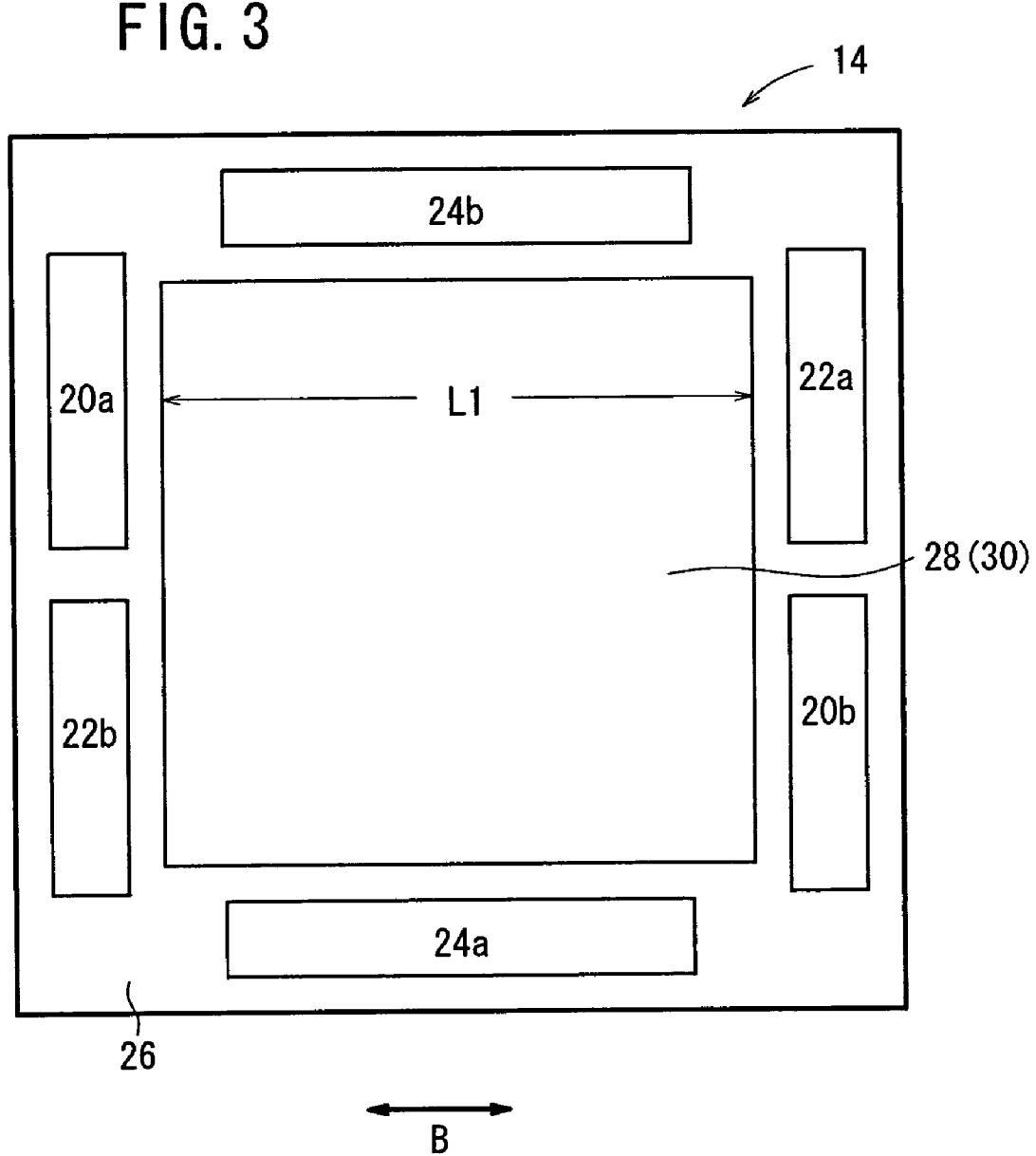
FIG. 3 is a front view showing a membrane electrode assembly of the unit cell.

As shown in FIGS. 1 and 3, the anode 28 and the cathode 30 of the membrane electrode assembly 14 have a substantially square shape having a side length L1. In the present embodiment, practically, the side length L1 is in a range of 140 mm to 200 mm, preferably in a range of 150 mm to 190 mm, and more preferably in a range of 160 mm to 180 mm.

Figure 4:
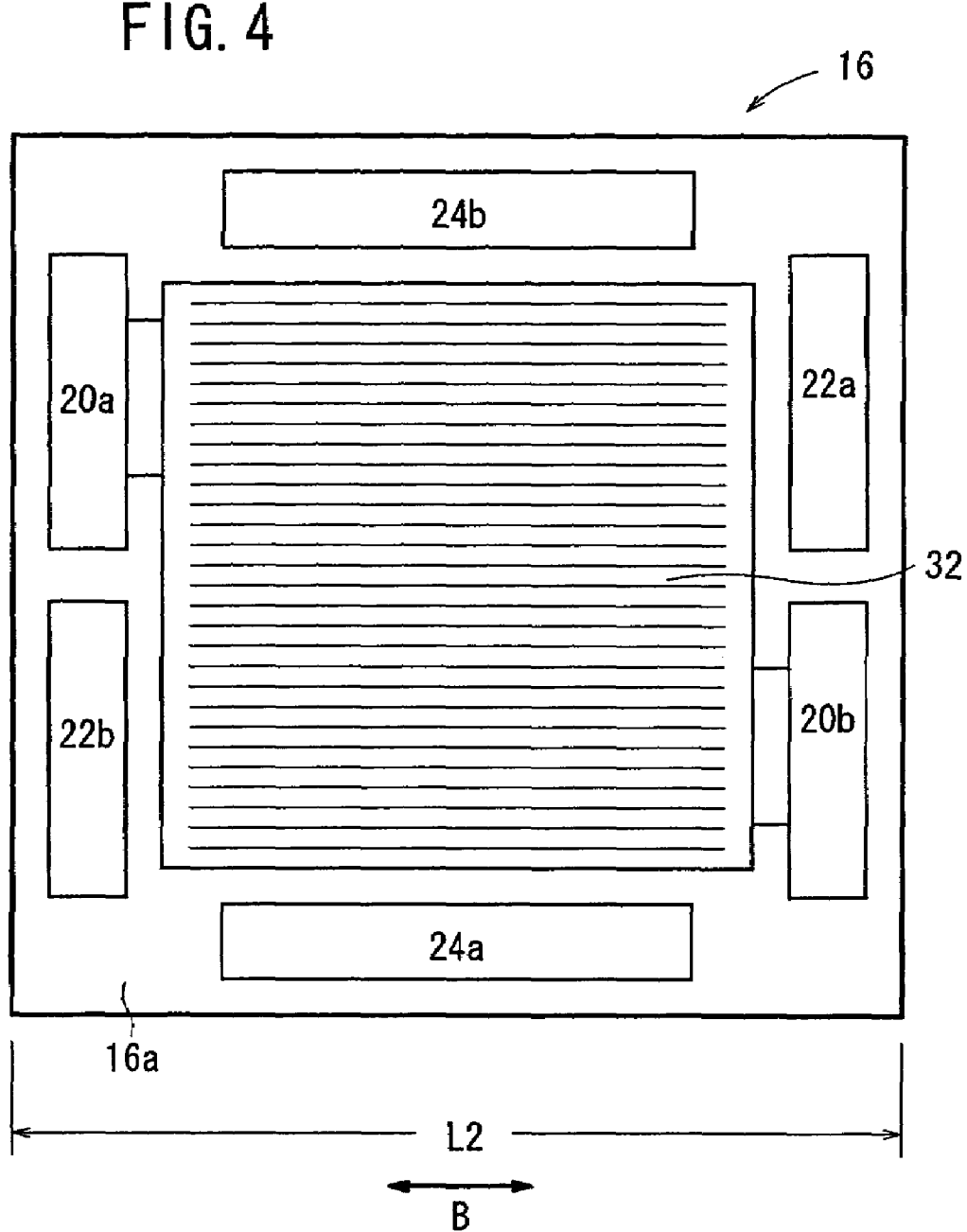
FIG. 4 is a front view showing a first separator of the unit cell.

As shown in FIGS. 1 and 4, the first separator 16 has a straight oxygen-containing gas flow passage (reactant gas flow passage) 32 on its surface 16a facing the cathode 30 for supplying the oxygen-containing gas along the cathode 30. The oxygen-containing gas flow passage 32 is connected to the oxygen-containing gas supply passage 20a at one end, and connected to the oxygen-containing gas discharge passage 20b at the other end. The oxygen-containing gas flow passage 32 comprises a plurality of grooves extending substantially straight in the direction indicated by the arrow B. As shown in FIG. 4, the first separator 16 has a substantially square shape having a side length L2. In the present embodiment, practically, the side length L2 is in a range of 200 mm to 300 mm, preferably in a range of 210 mm to 290 mm, and more preferably in a range of 220 mm to 280 mm.

As shown in FIG. 1, the second separator 18 has a straight fuel gas flow passage (reactant gas flow passage) 34 on its surface 18a facing the anode 28 for supplying the fuel gas along the anode 28. The fuel gas flow passage 34 and the oxygen-containing gas flow passage 32 have substantially the same structure. The fuel gas flow passage 34 is connected to the fuel gas supply passage 22a at end, and connected to the fuel gas discharge passage 22b at the other end. The fuel gas flow passage 34 comprises a plurality of grooves extending substantially straight in the direction indicated by the arrow B.

The second separator 18 has a straight coolant flow passage 36 on the other surface 18b opposite to the surface 18a. The coolant flow passage 36 comprises a predetermined number of grooves extending substantially straight in a vertical direction indicated by an arrow C. The coolant flow passage 36 is connected to the coolant supply passage 24a at one end, and connected to the coolant discharge passage 24b at the other end. As with the first separator 16, the second separator 18 has a substantially square shape having the side length L2 (e.g., in the rage of 200 mm to 300 mm). At the center of the seal member 19, an opening 40 is formed for providing the anode 28 or the cathode 30 (see FIG. 1).

A plurality of the fuel cell stacks 10 are used to selectively form a first assembly 50, a second assembly 52, a third assembly 54, and a fourth assembly 56 as described later on with reference to FIGS. 5 through 8 depending on conditions for installing the fuel cell stacks 10 in the vehicle. The installation conditions will be described later on.

Figure 5:
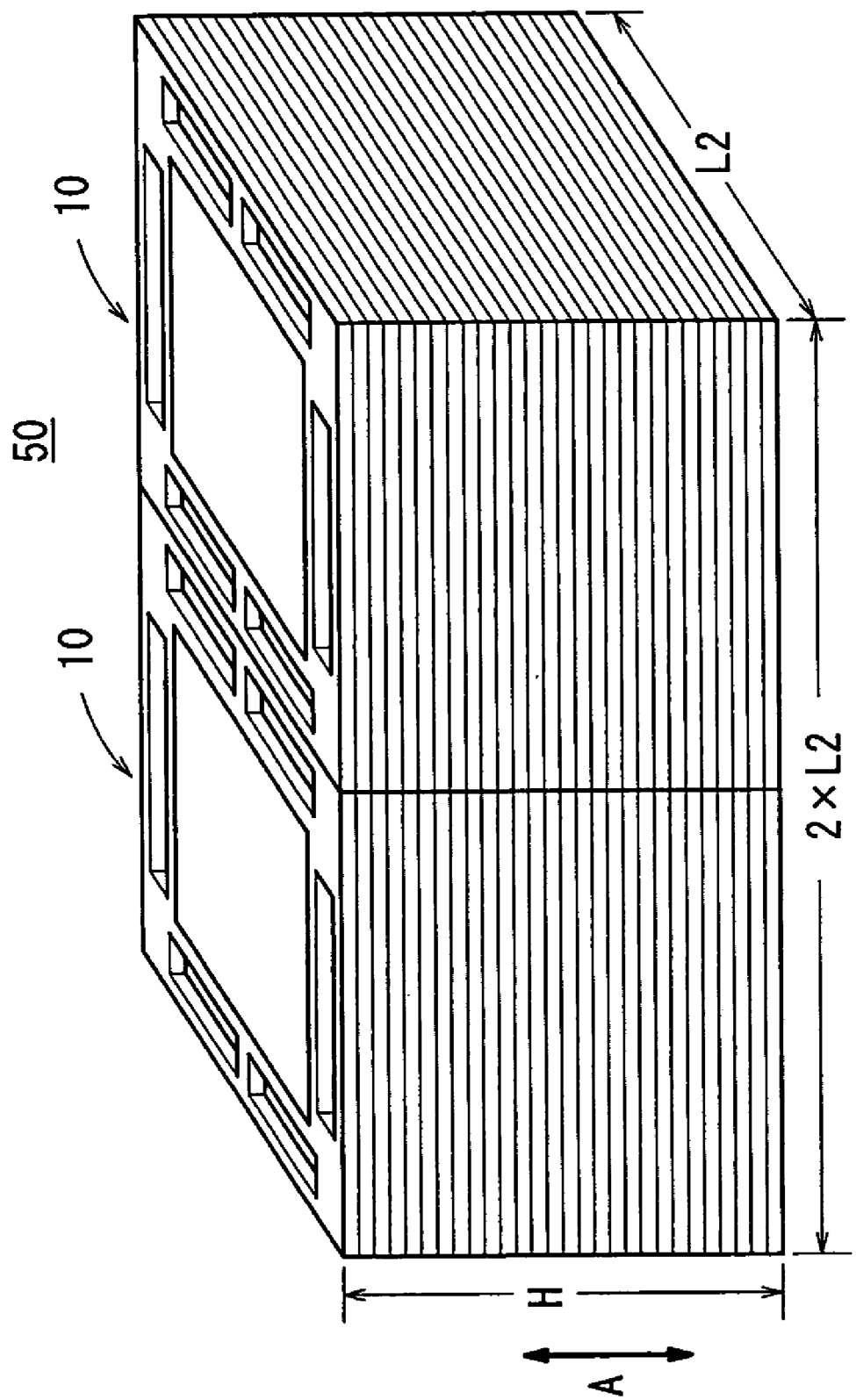
FIG. 5 is a view showing a first assembly.

As shown in FIG. 5, the first assembly 50 is formed by juxtaposing two fuel cell stacks 10 adjacent to each other. The stacking direction of the fuel cell stacks 10 indicated by an arrow A is oriented substantially vertically. The first assembly 50 has a width of 2×L2, and a depth of L2, and a height of H. The height (H) can be adjusted by changing the number of unit cells stacked to form each of the fuel cell stacks 10.

Figure 6:
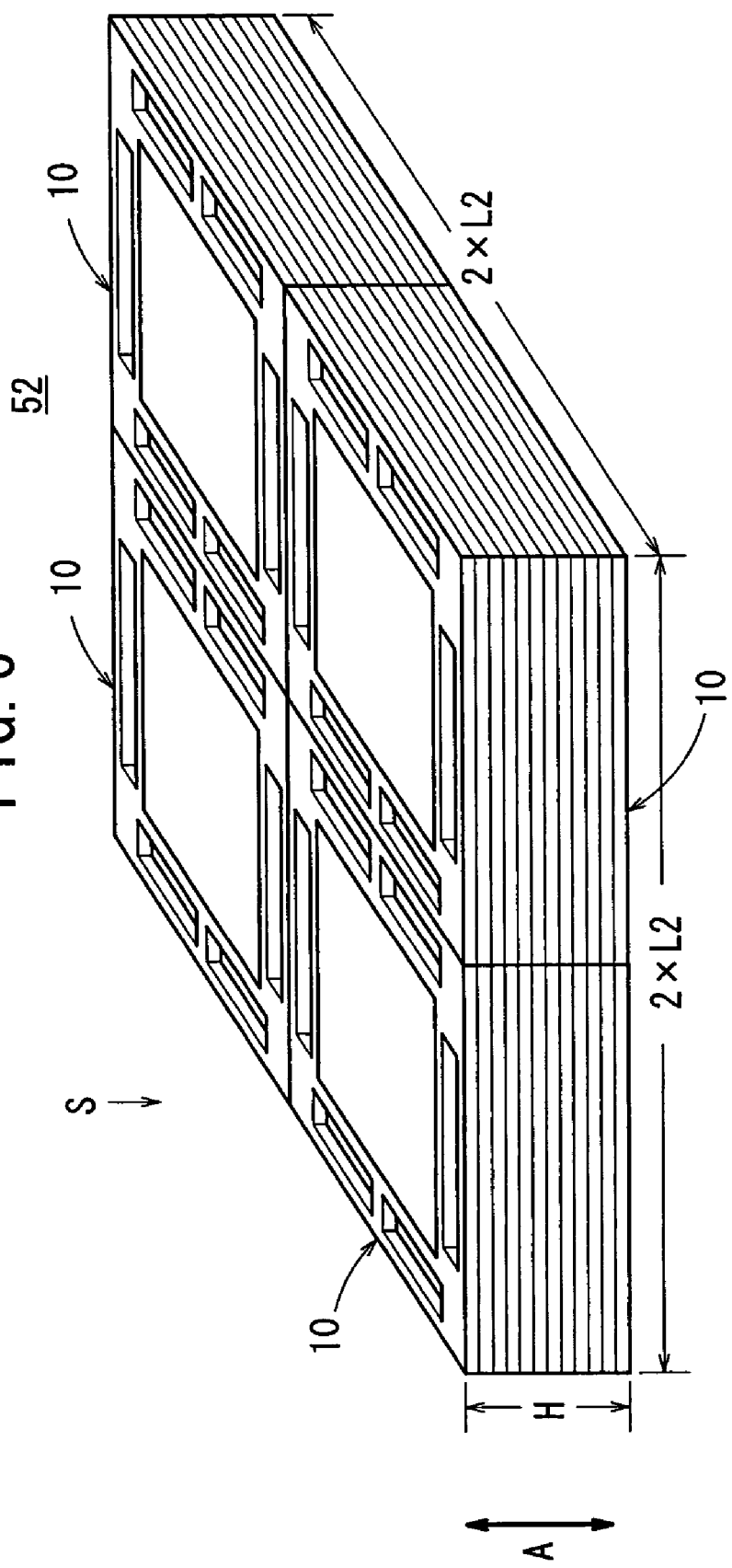
FIG. 6 is a view showing a second assembly.

As shown in FIG. 6, the second assembly 52 is formed by arranging four fuel cell stacks 10 adjacent to each other such that the second assembly 52 has a square shape in a plan view looking in a direction indicated by an arrow S. The stacking direction of the fuel cell stacks 10 indicated by an arrow A is oriented substantially vertically. The second assembly 52 has a width of 2×L2, and a depth of 2×L2, and a height of H. The height (H) can be adjusted by changing the number of unit cells stacked to form each of the fuel cell stacks 10.

Figure 7:
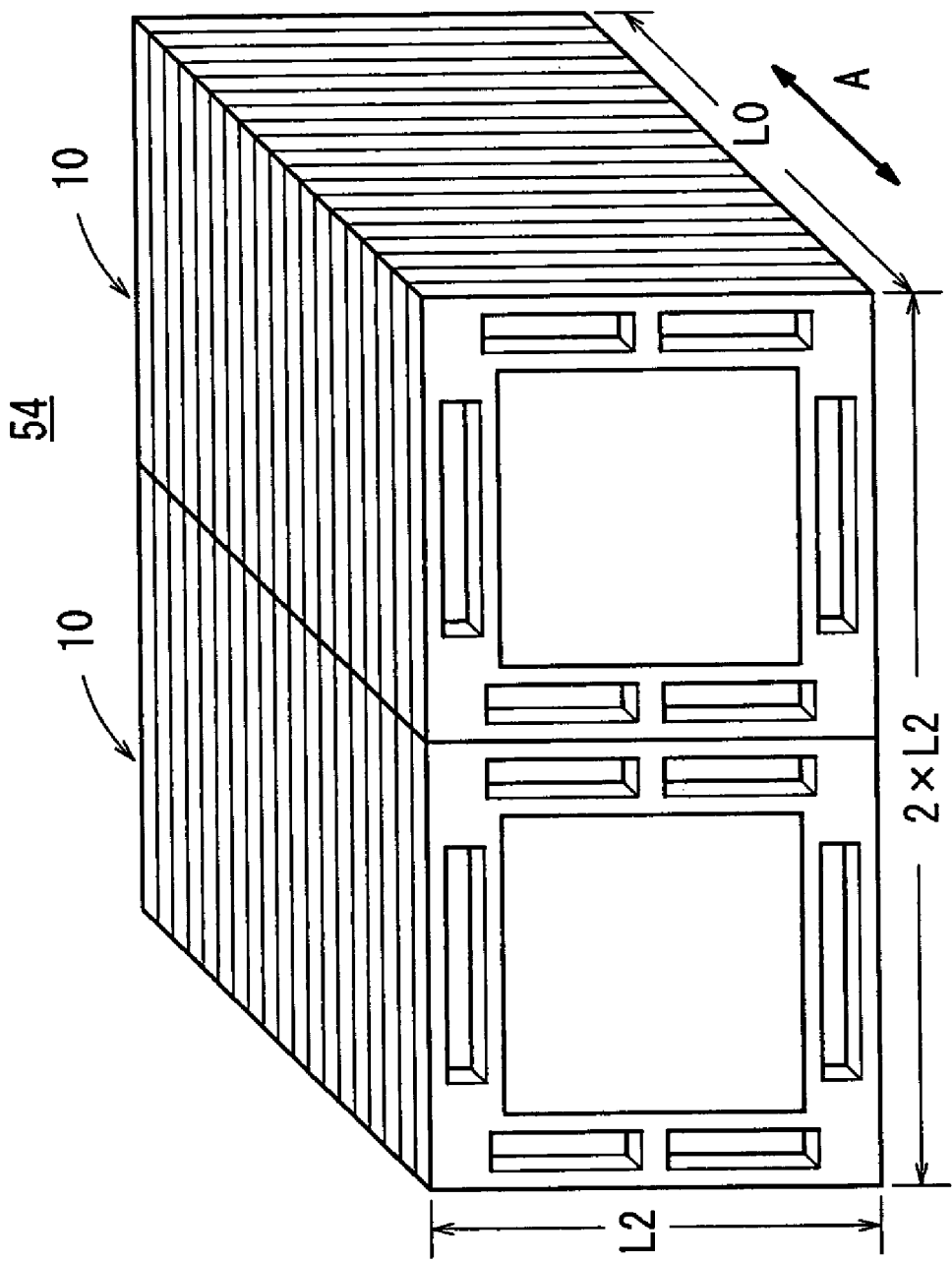
FIG. 7 is a view showing a third assembly.

As shown in FIG. 7, the third assembly 54 is formed by juxtaposing two fuel cell stacks 10 adjacent to each other. The stacking direction of the fuel cell stacks 10 indicated by an arrow A is oriented substantially horizontally. The third assembly 54 has a width of 2×L2, a depth of L0, and a height of L2. The depth (L0) can be adjusted by changing the number of unit cells stacked to form each of the fuel cell stacks 10.

Figure 8:
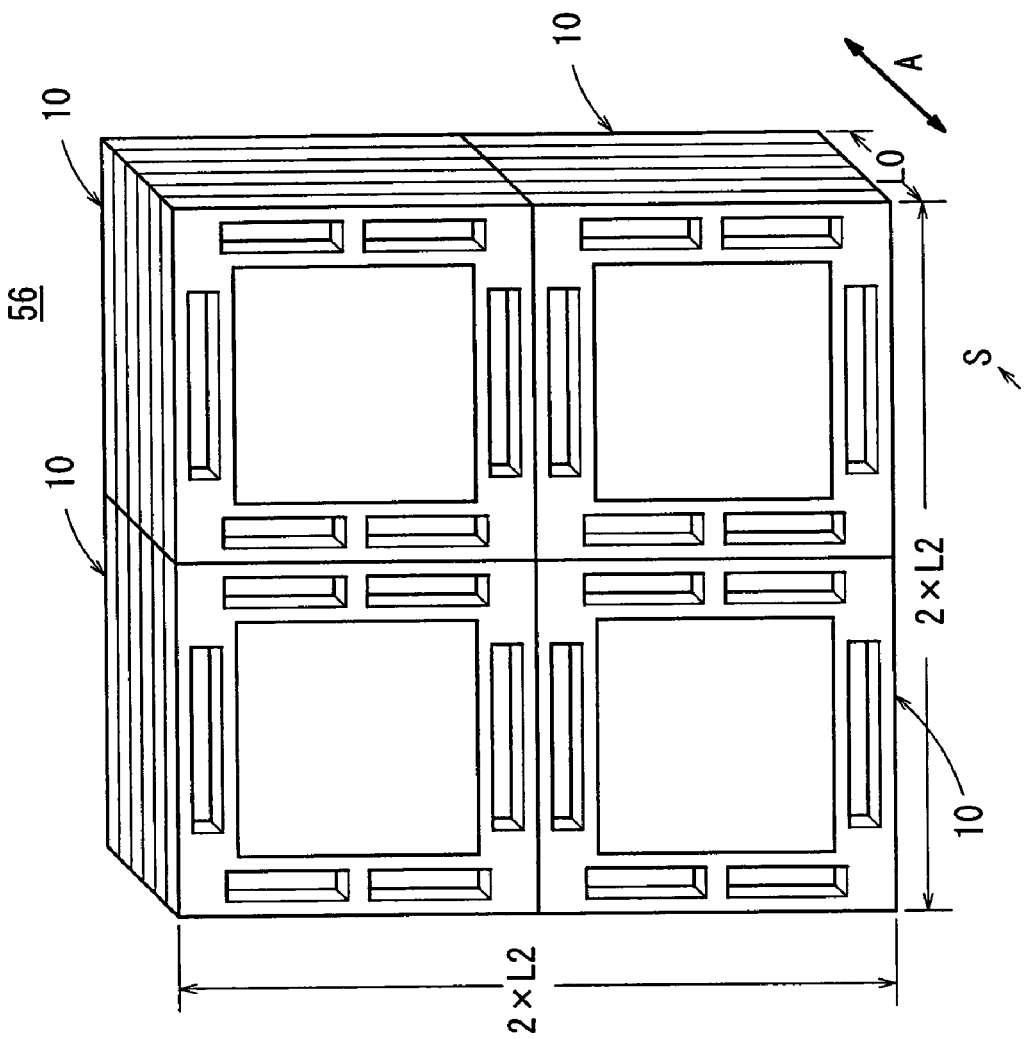
FIG. 8 is a view showing a fourth assembly.

As shown in FIG. 8, the fourth assembly 56 is formed by arranging four fuel cell stacks 10 adjacent to each other such that the fourth assembly 56 has a square shape in a front view looking in a direction indicated by an arrow S. The stacking direction of the fuel cell stacks 10 indicated by an arrow A is oriented substantially horizontally. The fourth assembly 56 has a width of 2×L2, a depth of L0, and a height of 2×L2. The depth (L0) can be adjusted by changing the number of unit cells stacked to form each of the fuel cell stacks 10.

Next, operation of the fuel cell stack 10 will be described below.

As shown in FIG. 1, in operating the fuel cell stack 10, an oxygen-containing gas such as air, a fuel gas such as a hydrogen-containing gas, and a coolant such as pure water, an ethylene glycol or an oil are supplied to the unit cells 12 of the fuel cell stack 10. The oxygen containing gas supplied to the oxygen-containing gas supply passage 20a extending in the direction indicated by the arrow A flows into the oxygen-containing gas supply passage 32 of the first separator 16 as shown in FIGS. 1 and 4. The oxygen-containing gas flows through the oxygen-containing gas flow passage 32 in the direction indicated by the arrow B along the cathode 30 of the membrane electrode assembly 14.

As shown in FIG. 1, the fuel gas is supplied to the fuel gas supply passage 22a extending in the direction indicated by the arrow A, and flows into the fuel gas flow passage 34. The fuel gas flows through the fuel gas flow passage 34 in the direction indicated by the arrow B along the anode 28 of the membrane electrode assembly 14.

In the membrane electrode assembly 14, the oxygen-containing gas supplied to the cathode 30, and the fuel gas supplied to the anode 28 are consumed in the electrochemical reactions at catalyst layers of the cathode 30 and the anode 28 for generating electricity (see FIG. 2).

After the oxygen-containing gas is consumed at the cathode 30, the oxygen-containing gas flows into the oxygen-containing gas discharge passage 20b (see FIG. 4). Similarly, after the fuel gas is consumed at the anode 28, the fuel gas flows into the fuel gas discharge passage 22b (see FIG. 1).

The coolant supplied to the coolant supply passage 24a flows into the coolant flow passage 36 of the second separator 18. The coolant flows through the coolant flow passage 36 in the vertically upward direction, and cools the membrane electrode assembly 14. Then, the coolant flows into the coolant discharge passage 24*b*.

In the present embodiment, the anode 28 and the cathode 30 of the membrane electrode assembly 14 have a substantially square shape having the side length L1 in the range of 140 mm to 200 mm. Therefore, the anode 28 and the cathode 30 have sufficient surface areas for producing high power output required for vehicles without using a large number of unit cells stacked to form the fuel cell stack 10. Therefore, the dimension in the stacking direction of the overall fuel cell stack 10 is small.

Figure 9:
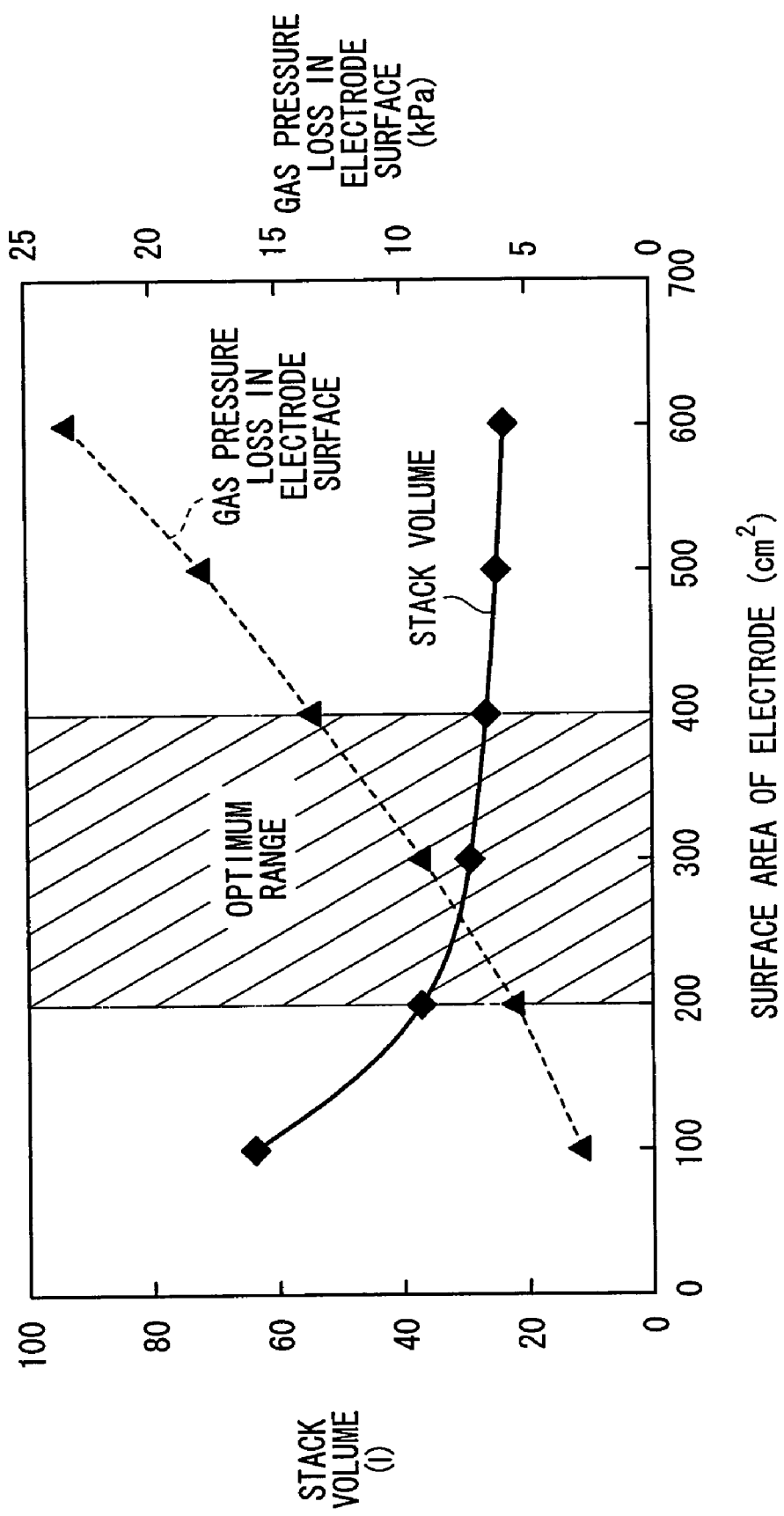
FIG. 9 is a view showing a relationship between the surface area of the electrode and the stack volume, and a relationship between the surface area of the electrode and the gas pressure loss in the electrode surface.

FIG. 9 shows a relationship between the surface area of the anode 28 or the cathode 30, and the volume of the fuel cell stack 10, and a relationship between the surface area of the anode 28 or the cathode 30, and the gas pressure loss in the electrode surface. When the surface area is less than 200 $cm^2$, the stack volume needs to be significantly large for obtaining the desired high output. When the surface area is greater than 400 $cm^2$, the gas pressure loss in the electrode surface is large. Therefore, the surface area in the range of 200 $cm^2$ to 400 $cm^2$ is suitable for controlling the gas pressure loss in the electrode surface, and reducing the stack volume.

Figure 10:
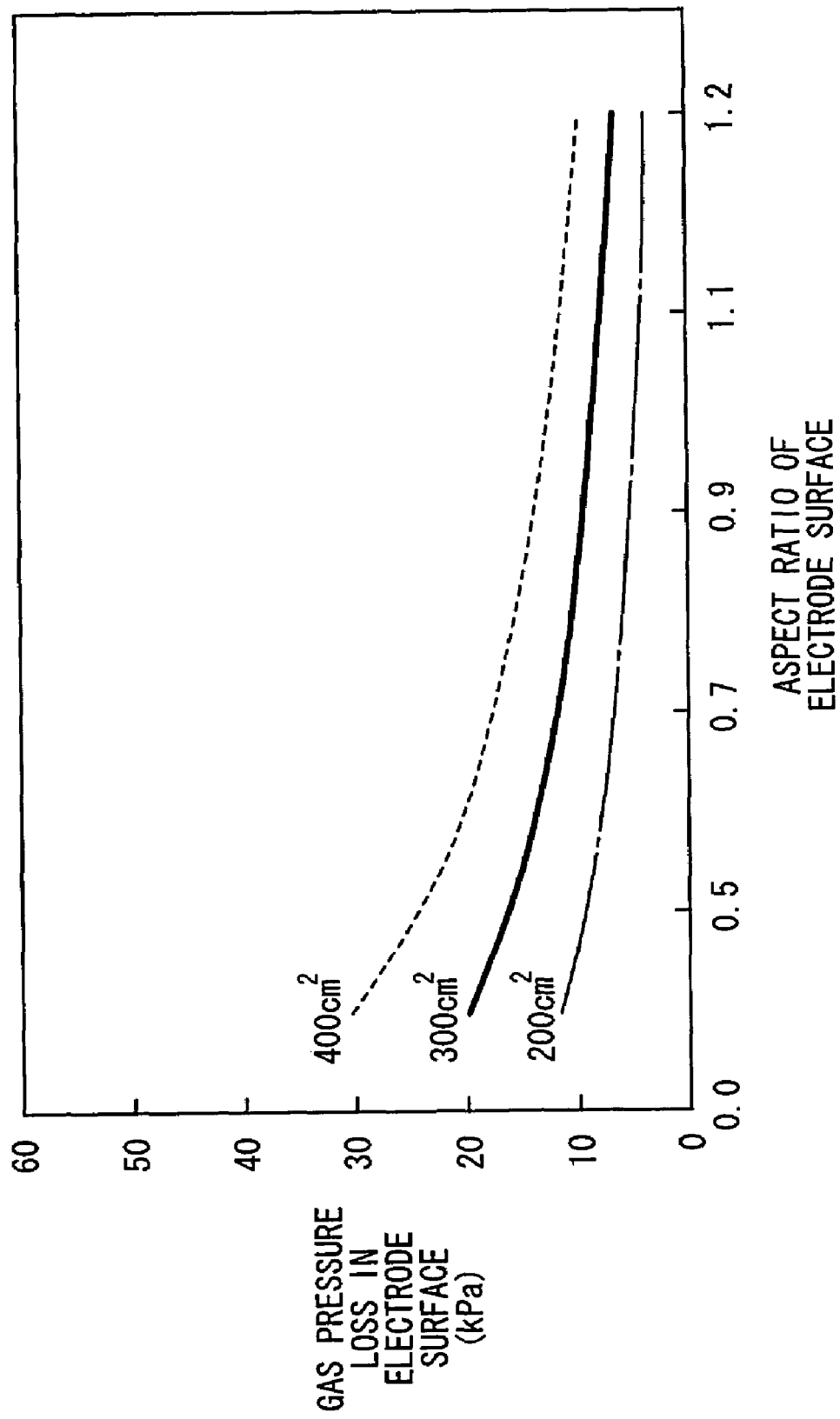
FIG. 10 is a view showing relationships between the aspect ratio of the electrode surface and the gas pressure loss in the electrode surface.
Figure 11A:
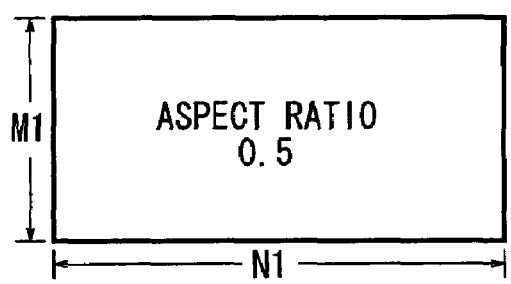
FIG. 11A is a view showing an electrode surface having an aspect ratio of 0.5.
Figure 11B:
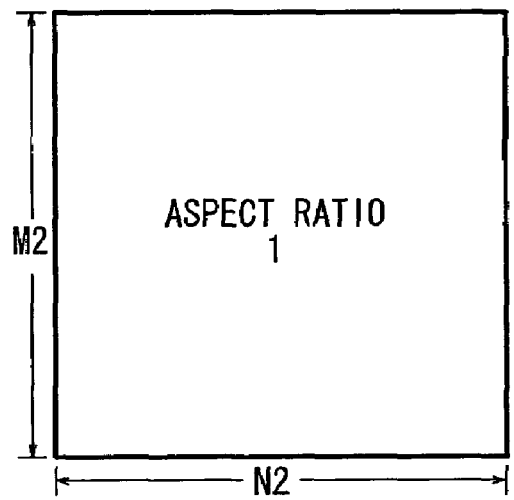
FIG. 11B is a view showing an electrode surface having an aspect ratio of 1.
Figure 11C:
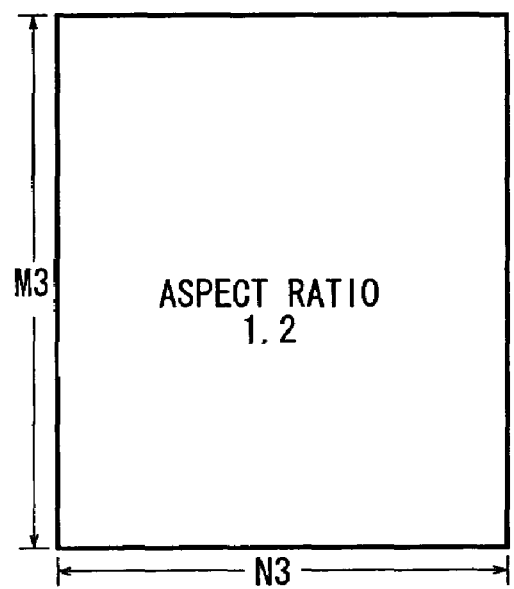
FIG. 11C is a view showing an electrode surface having an aspect ratio of 1.2.

FIG. 10 shows relationships between the aspect ratio of the electrode surface and the gas pressure loss in the electrode surface when the surface area of the electrode surface is 200 $cm^2$, 300 $cm^2$, and 400 $cm^2$. The aspect ratio indicates the ratio of the longitudinal dimension to the lateral dimension in the electrode surface. As shown in FIG. 11A, when the aspect ratio of the electrode surface is 0.5, the ratio of the longitudinal dimension M1 to the lateral dimension N1, i.e., M1:N1=1:2. As shown in FIG. 11B, when the aspect ratio of the electrode surface is 1, the ratio of the longitudinal dimension M2 to the lateral dimension N2, i.e., M2:N2=1:1. As shown in FIG. 11C, when the aspect ratio of the electrode surface is 1.2, the ratio of the longitudinal dimension M3 to the lateral dimension N3, i.e., M3:N3=1.2:1.

The electrode surface having a substantially square shape effectively reduces the gas pressure loss in the electrode surface. The oxygen-containing gas flow passage 32 and the fuel gas flow passage 34 extend straight. Therefore, the gas pressure loss in the oxygen-containing gas and the fuel gas is small.

Centers of the substantially square anode 28 and cathode 30 are substantially in alignment with centers of the substantially square first and second separators 16, 18. Therefore, the oxygen-containing gas supply passage 20*a* and the fuel gas supply passage 22*a* are formed symmetrically with the oxygen-containing gas discharge passage 20*b* and the fuel gas discharge passage 22*b*, respectively. Therefore, the reactions in the electrode surfaces are uniform, and the power generation performance can be improved effectively.

The first and second separators 16, 18 have a substantially square shape having the side length L2 in the range of 200 mm to 300 mm. Thus, for example, as shown in FIG. 5, in the first assembly 50 including two fuel stacks 10 juxtaposed adjacent to each other, the width 2×L2 is in the range of 400 mm to 600 mm. The width of the first assembly 50 is suitable for the vehicle application.

Therefore, by changing the number of unit cells 12 stacked to form the fuel cell stack 10, changing the stacking direction, changing the number of fuel cell stacks 10 arranged to form the assembly, changing the orientation of the fuel cell stacks 10 arranged to form the assembly, the fuel cell stack 10 can be installed suitably in different positions in various types of vehicles easily.

Figure 12:
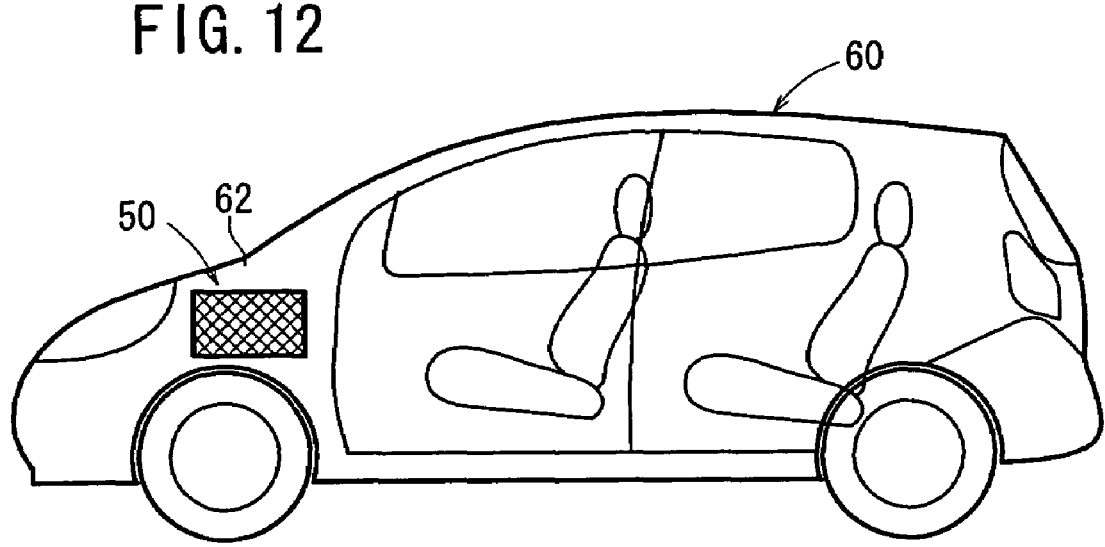
FIG. 12 is a view showing the fuel cell stack installed in a minivan type vehicle.

Specifically, in FIG. 12, the first assembly 50 is installed in a front box 62 of a minivan type vehicle 60. Two fuel cell stacks 10 are juxtaposed adjacent to each other to form the first assembly 50. The stacking direction of the unit cells in the first assembly 50 is oriented substantially vertically.

Figure 13:
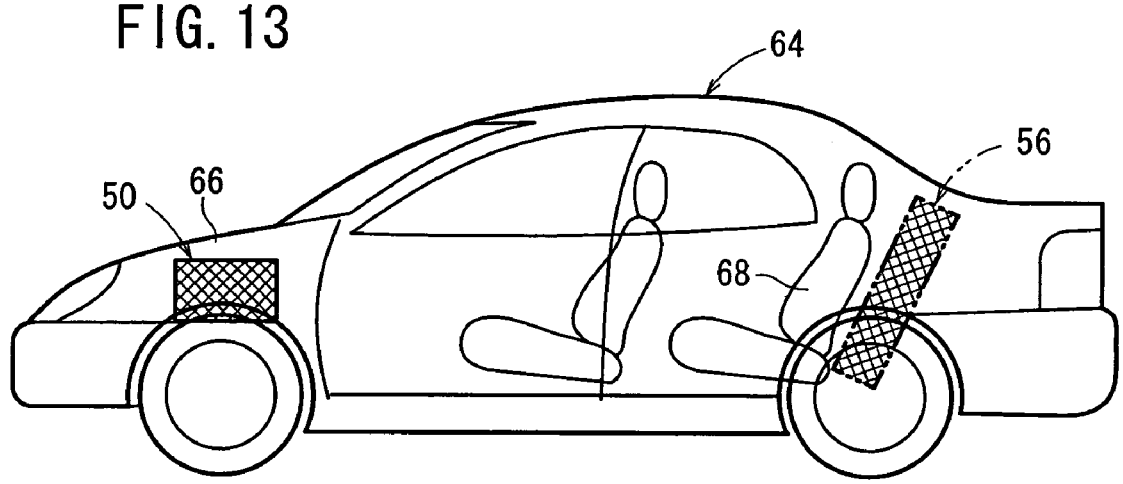
FIG. 13 is a view showing the fuel cell stack installed in a sedan type vehicle.

Further, in FIG. 13, the first assembly 50 is installed in a front box 66 of a sedan type vehicle 64. Alternatively, the fourth assembly 56 may be installed behind a rear seat 68. In this case, the fourth assembly 56 is inclined substantially in parallel with the inclined rear seat 68. The stacking direction of the unit cells in the fourth assembly 56 is oriented substantially in a direction in which the vehicle 64 travels.

Figure 14:
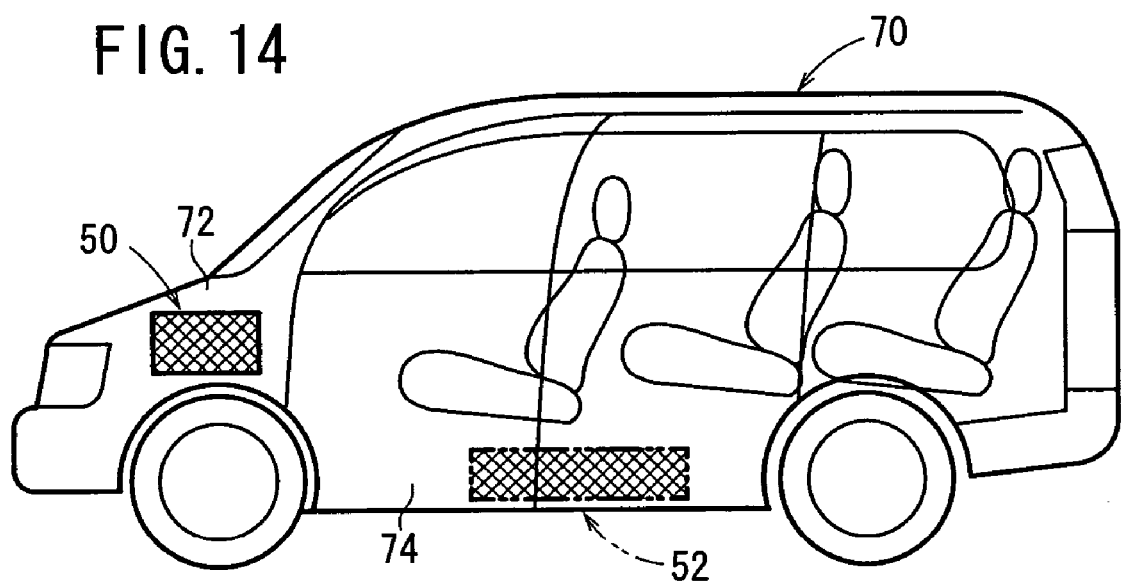
FIG. 14 is a view showing the fuel cell stack installed in a one box type vehicle.

Further, in FIG. 14, the first assembly 50 is installed in a front box 72 of a one box type vehicle 70. Alternatively, the second assembly 52 may be installed in an under-floor region 74 of the vehicle 70. The stacking direction of the unit cells in the second assembly 52 is oriented substantially in a vertical direction.

Figure 15:
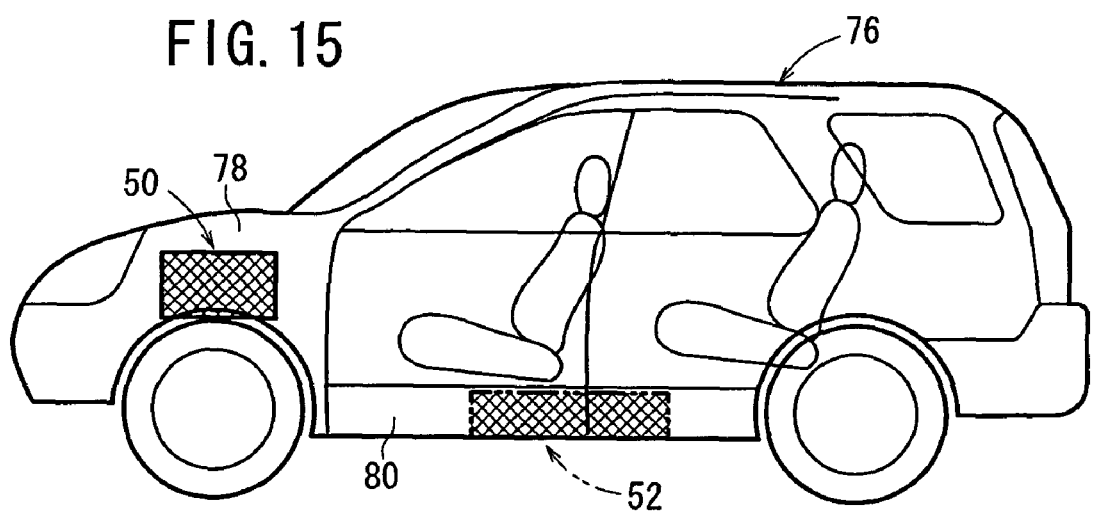
FIG. 15 is a view showing the fuel cell stack installed in a recreational vehicle.

Further, in FIG. 15, as with the vehicle 70 shown in FIG. 14, the first assembly 50 is installed in a front box 78 of a recreational vehicle 76. Alternatively, the second assembly 52 may be installed in an under-floor region 80 of the vehicle 76.

Figure 16:
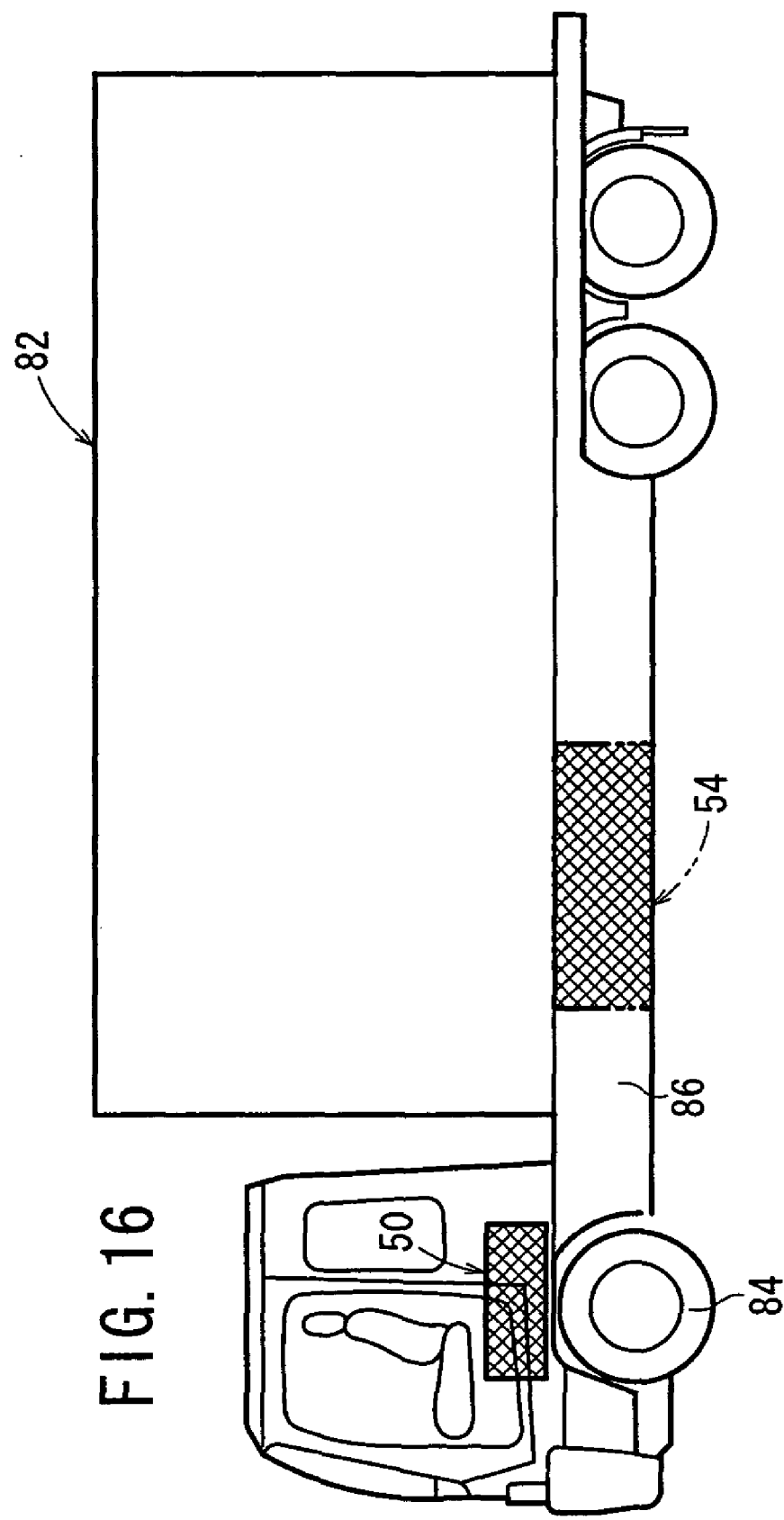
FIG. 16 is a view showing the fuel cell stack installed in a truck.

Further, in FIG. 16, the first assembly 50 is installed above front wheels 84 in a truck 82. Alternatively, the third assembly 54 may be installed in an under-floor region 86 of the truck 82. The stacking direction of the unit cells in the third assembly 54 is oriented substantially in a direction in which the truck 82 travels.

Figure 17:
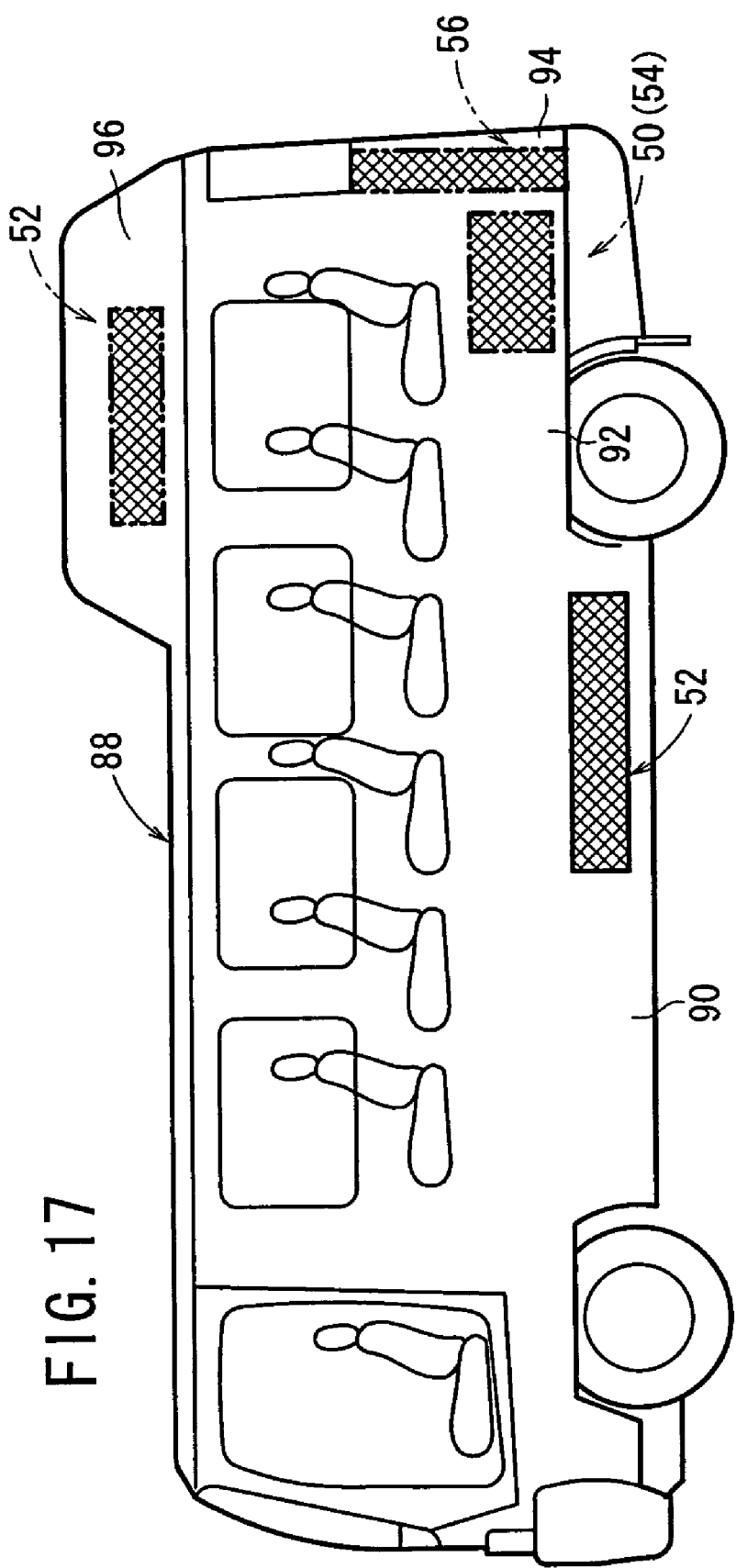
FIG. 17 is a view showing the fuel cell stack installed in a bus.

Further, in FIG. 17, the second assembly 52 is installed in an under-floor region 90 of a bus 88. Alternatively, the first assembly 50 or the third assembly 54 may be installed in a rear region 92 of the bus 88. Further, the fourth assembly 56 may be installed at the back of the bus 88, or the second assembly 52 may be installed in a ceiling region 96 of the bus 88.

In the present embodiment, the fuel cell stack 10 can be installed in the various types of vehicles 60, 64, 70, 76, 82, and 88. Depending on installation conditions, the fuel cell stack 10 is selectively assembled into any of the first through fourth assemblies 50, 52, 54, and 56. Therefore, the design, development, equipment for producing the dedicated fuel cell stack 10 for each type of the vehicles are not necessary. Since the unit cell 12 having the same structure can be applicable to various types of vehicles, the production cost of the fuel cell stack 10 is significantly reduced.

The fuel cell stack 10 can be used in a large vehicle such as the truck 82 or the bus 88 which requires a large output, simply by increasing the number of the unit cells 12 in the first assembly 50, the second assembly 52, the third assembly 54, or the fourth assembly 56. It is not necessary to change the design of the electrode surface, such as the surface area of the anode 28 or the cathode 30 for obtaining the large output. Therefore, with the simple structure, the fuel cell stack 10 can be produced economically.

In the unit cell 12, the oxygen-containing gas supply passage 20*a*, the fuel gas supply passage 22*a*, the oxygen-containing gas discharge passage 20*b*, and the fuel gas discharge passage 22*b* extend through two parallel side portions of the first and second separators 16, 18 in the stacking direction, and a coolant supply passage 24*a* and a coolant discharge passage 24*b* extend through other two parallel side portions of the separators 16, 18 in the stacking direction. Therefore, the surfaces of the separators 16, 18 can be utilized efficiently, and the size of the overall fuel cell stack 10 can be reduced easily.

According to the fuel cell stack of the present invention, the electrodes have a substantially square shape having a side length in the range of 140 mm to 200 mm, and the separators have a substantially square shape having a side length in the rage of 200 mm to 300 mm. Therefore, the size of the overall fuel cell stack can be reduced effectively. By changing the number of unit cells stacked to form the fuel cell stack, changing the stacking direction, changing the number of fuel cell stacks arranged to form the assembly, changing the orientation of the fuel cell stacks arranged to form the assembly, for example, the fuel cell stack can be installed in different positions in various types of vehicles.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a plurality of unit cells stacked in a stacking direction, wherein
   each unit cell includes a first separator, a second separator, and an electrolyte electrode assembly that is sandwiched between the first and second separators,
   the electrolyte electrode assembly includes a pair of electrodes and an electrolyte interposed between said electrodes,
   said electrodes have a substantially square shape having a side length in a range of 140 mm to 200 mm, and said first and second separators have a substantially square shape having a side length in a range of 200 mm to 300 mm, and
   at least one of said first separator and said second separator has:
      a reactant gas supply passage formed in a first side portion,
      a reactant gas discharge passage formed in a second side portion opposite the first side portion,
      a reactant gas flow passage formed on a first surface facing said electrodes, the reactant gas flow being formed along a substantial portion of the first surface in a direction from the first side portion to the second side portion,
      a coolant supply passage formed in a third side portion,
      a coolant discharge passage formed in a fourth side portion opposite the third side portion, and
      a coolant flow passage formed on a second surface opposite the first surface, the coolant flow passage being formed along a substantial portion of the second surface in a direction from the third side portion to the forth side portion and connected to the coolant supply passage and the coolant discharge passage,
   wherein the coolant flow passage is formed between one of said first separator or said second separator of a unit cell and one of said first separator or said second separator of an adjacent unit cell.

2. A fuel cell stack according to claim 1, wherein said reactant gas supply passage and said reactant gas discharge passage extend through two parallel side portions of said first and second separators in said stacking direction, and said coolant supply passage and said coolant discharge passage extend through other two parallel side portions of said first and second separators in said stacking direction, wherein the coolant supply passage is in fluid communication with the coolant discharge passage through the coolant flow passage.

3. A fuel cell stack according to claim 2, wherein centers of said electrodes are substantially in alignment with centers of said first and second separators.

4. A fuel cell stack according to claim 3, wherein said reactant gas supply passage and said reactant gas discharge passage are formed symmetrically on a surface of said first and second separators.

5. A fuel cell stack according to claim 2, wherein a straight reactant gas flow passage connecting said reactant gas supply passage and said reactant gas discharge passage is formed on the first surface of said first and second separators for supplying a reactant gas to said electrodes.

* * * * *